(12) United States Patent
Sweeney et al.

(10) Patent No.: US 11,446,867 B2
(45) Date of Patent: Sep. 20, 2022

(54) ATMOSPHERIC PLASMA CONDUCTION PATHWAY FOR THE APPLICATION OF ELECTROMAGNETIC ENERGY TO 3D PRINTED PARTS

(71) Applicant: Essentium, Inc, Pflugerville, TX (US)

(72) Inventors: Charles Brandon Sweeney, Pflugerville, TX (US); Blake Teipel, Pflugerville, TX (US); Travis Eubanks, San Antonio, TX (US); John Stockton, Austin, TX (US); Alex Stockton, Pflugerville, TX (US)

(73) Assignee: ESSENTIUM, INC., Pflugerville, TX (US)

( * ) Notice: Subject to any disclaimer, the term of this patent is extended or adjusted under 35 U.S.C. 154(b) by 129 days.

(21) Appl. No.: 16/498,079

(22) PCT Filed: Feb. 19, 2018

(86) PCT No.: PCT/US2018/018629
§ 371 (c)(1),
(2) Date: Sep. 26, 2019

(87) PCT Pub. No.: WO2018/156458
PCT Pub. Date: Aug. 30, 2018

(65) Prior Publication Data
US 2020/0298479 A1     Sep. 24, 2020

Related U.S. Application Data

(60) Provisional application No. 62/463,368, filed on Feb. 24, 2017.

(51) Int. Cl.
*B29C 64/209* (2017.01)
*B29C 64/118* (2017.01)
(Continued)

(52) U.S. Cl.
CPC .......... *B29C 64/209* (2017.08); *B29C 64/118* (2017.08); *B33Y 10/00* (2014.12);
(Continued)

(58) Field of Classification Search
CPC ... B29C 64/209; B29C 64/118; B29C 64/264; B29C 64/10; B29C 64/106;
(Continued)

(56) References Cited

U.S. PATENT DOCUMENTS 2,542,589 A      2/1951  Stanton et al.
3,831,985 A  *   8/1974  Oostenbrink ........... F16L 47/16
                                                          285/140.1
(Continued)

FOREIGN PATENT DOCUMENTS

CN       104395032 A      3/2015
CN       104708828 A      6/2015
(Continued)

OTHER PUBLICATIONS

Plasma (physics)—Wikipedia_Dec. 31, 2016 (Year: 2016).*
(Continued)

*Primary Examiner* — Yunju Kim
(74) *Attorney, Agent, or Firm* — Vivacqua Crane, PLLC

(57) ABSTRACT

A three-dimensional (3D) printing process utilizing an atmospheric plasma to conduct an electromagnetic energy to fuse extruded successive layers of thermoplastic material having a conductive material is disclosed. A 3D printing system for the 3D printing process is also provided. The 3D printing system includes a 3D printer, an extrusion nozzle, a plasma emitter, and an electromagnetic energy source. The 3D printing process includes the steps of extruding a thermoplastic composite with the extrusion nozzle in successive layers to form a 3D part; directing a substantially evenly distributed plasma onto a predetermined location on the 3D
(Continued)

part; and emitting an electromagnetic energy through the plasma. The plasma conducts the electromagnetic energy to the predetermined location on the 3D part. The thermoplastic composite includes a conductive material that generates heat by reacting to the electromagnetic energy.

18 Claims, 3 Drawing Sheets

(51) Int. Cl.
*B33Y 10/00* (2015.01)
*B33Y 30/00* (2015.01)
*B33Y 70/00* (2020.01)
*B33Y 70/10* (2020.01)
*B29K 101/12* (2006.01)
*B29K 507/04* (2006.01)
*B29K 509/02* (2006.01)

(52) U.S. Cl.
CPC .............. *B33Y 30/00* (2014.12); *B33Y 70/10* (2020.01); *B29K 2101/12* (2013.01); *B29K 2507/04* (2013.01); *B29K 2509/02* (2013.01); *B29K 2995/0005* (2013.01)

(58) Field of Classification Search
CPC ..... B29C 64/112; B29C 64/129; B29C 64/20; B29C 64/205; B29C 64/295; B29C 59/14; B29C 2059/145; B29K 2101/12; B29K 2507/04; B29K 2509/02; B29K 2995/0005; B33Y 10/00; B33Y 30/00; B33Y 70/10; C23C 4/134
See application file for complete search history.

(56) References Cited

U.S. PATENT DOCUMENTS

| | | | |
|---|---|---|---|
| 5,338,497 A | 8/1994 | Murray et al. |
| 5,807,437 A | 9/1998 | Sachs et al. |
| 6,649,888 B2 | 11/2003 | Ryan et al. |
| 6,812,445 B2 | 11/2004 | Gorbold |
| 7,725,209 B2 | 5/2010 | Menchik et al. |
| 9,662,840 B1 | 5/2017 | Buller et al. |
| 10,513,080 B2 | 12/2019 | Kim et al. |
| 2002/0079121 A1 | 6/2002 | Ryan et al. |
| 2003/0199251 A1 | 10/2003 | Gorbold |
| 2011/0134170 A1 | 6/2011 | Addy |
| 2012/0164256 A1 | 6/2012 | Swanson et al. |
| 2014/0265037 A1 | 9/2014 | Stirling et al. |
| 2014/0361464 A1 | 12/2014 | Holcomb |
| 2015/0042017 A1 | 2/2015 | Ramaswamy et al. |
| 2015/0053656 A1 | 2/2015 | Popp et al. |
| 2015/0140158 A1 | 5/2015 | Cervantes et al. |
| 2015/0273582 A1 | 10/2015 | Crump et al. |
| 2015/0291833 A1 | 10/2015 | Kunc et al. |
| 2015/0360427 A1 | 12/2015 | Shah et al. |
| 2016/0016369 A1 | 1/2016 | Tarbutton et al. |
| 2016/0096327 A1 | 4/2016 | Fry et al. |
| 2016/0271874 A1 | 9/2016 | Tsai et al. |
| 2016/0288414 A1 | 10/2016 | Ozbolat et al. |
| 2016/0312037 A1 | 10/2016 | Zhao et al. |
| 2016/0318248 A1 | 11/2016 | Susnjara et al. |
| 2016/0325487 A1 | 11/2016 | Miller |
| 2016/0325491 A1 | 11/2016 | Sweeney et al. |
| 2017/0151704 A1 | 6/2017 | Go et al. |
| 2017/0341183 A1 | 11/2017 | Buller et al. |
| 2018/0132157 A1 | 7/2018 | Yang |
| 2018/0370141 A1* | 12/2018 | Eller ..................... B29C 64/194 |
| 2019/0256962 A1* | 8/2019 | Kobayashi ............... H05H 1/40 |
| 2019/0344502 A1 | 11/2019 | Sweeney et al. |
| 2019/0375156 A1 | 12/2019 | Knox |
| 2020/0335303 A1* | 10/2020 | Gandhiraman ...... H05H 1/2425 |

FOREIGN PATENT DOCUMENTS

| | | |
|---|---|---|
| CN | 106029333 A | 10/2016 |
| CN | 106041080 A | 10/2016 |
| CN | 108248043 A | 7/2018 |
| EP | 3526290 A2 | 8/2019 |
| WO | 2013152805 A1 | 10/2013 |
| WO | 2015147939 A1 | 10/2015 |
| WO | 2015191757 A1 | 12/2015 |
| WO | 2016051163 A1 | 4/2016 |
| WO | 2016060703 A1 | 4/2016 |
| WO | 2016154103 A1 | 9/2016 |
| WO | 2017210490 A1 | 12/2017 |
| WO | 2018132157 A2 | 7/2018 |
| WO | 2018156458 A1 | 8/2018 |
| WO | 2018213718 A1 | 11/2018 |

OTHER PUBLICATIONS

European Search Report in 18756979.3, European Patent Office, dated Sep. 17, 2020.
First Office Action in 201880013621X, China National Intellectual Property Administration, dated Jan. 15, 2021.
International Preliminary Report on Patentability in PCT/US18/18629, International Searching Authority WIPO, dated May 24, 2019.
International Search Report and Written Opinion in PCT/US18/18629, International Searching Authority WIPO, dated Apr. 8, 2018.
Wikipedia. "Alternating Current," Dec. 18, 2016 (Dec. 18, 2016) p. 1 para[0002]; Retrieved from <https:1/en.wikipedia.org/wlindex.phptitle=Alternating_current oldid= 755493680> on Aug. 24, 2018 (Aug. 24, 2018).
Rouse. "Ground," Mar. 15, 2010 (Mar. 15, 2010) p. 1 para[0002]; Retrieved from <https:1/whatis.techtarget.com/definition/ground> on Aug. 24, 2018 (Aug. 24, 2018).
Gannon, et al. "Carbon Nanotube-enhanced Thermal Destruction of Cancer Cells in a Noninvasive Radiofrequency Field." American Cancer Society, published Dec. 15, 2007, pp. 2654-2665, vol. 110 Iss. 12.
Moran, et al. "Size-Dependent Joule Heating of Gold Nanoparticles Using Capacitively Coupled Radiofrequency Fields," Nano Research, 2009, pp. 400-405.
International Searching Authority. International Search Report and Written Opinion for PCT Application No. PCT/US2017/059878, dated Aug. 6, 2018, pp. 1-6.

* cited by examiner

ATMOSPHERIC PLASMA CONDUCTION PATHWAY FOR THE APPLICATION OF ELECTROMAGNETIC ENERGY TO 3D PRINTED PARTS

CROSS-REFERENCE TO RELATED APPLICATION

This application is a national stage completion of PCT/US2018/018629, filed on Feb. 19, 2018, which claims the benefit of priority from U.S. Provisional Application No. 62/463,368 filed on Feb. 24, 2017, the contents of these applications are incorporated by reference.

TECHNICAL FIELD

The present disclosure relates generally to an apparatus and system for heating polymer composites for enhanced bonding of 3D printed parts.

BACKGROUND

The statements in this section merely provide background information related to the present disclosure and may or may not constitute prior art.

Three-dimensional (3D) printing is an additive manufacturing process for producing 3D models, which may include prototype or production parts, directly from a digital model. Additive manufacturing is a process that takes virtual blueprints from computer aided design (CAD) or animation modeling software and slices them into digital cross-sections for the 3D printing apparatus for use as a guideline for printing the 3D model. Layers of composite material are successively deposited in droplets or continuous beads until the final 3D model has been printed. These layers are jointly welded, also known as fused, to create and maintain the shape of the printed 3D model.

For 3D printing apparatus that use an extrusion deposition process, such as Fused Filament Fabrication (FFF) and Fused Deposition Modeling (FDM), a thermoplastic composite filament is applied through a heated extrusion nozzle. The thermoplastic composite filament may include various polymers such as acrylonitrile butadiene styrene (ABS), polycarbonate (PC), polylactic acid (PLA), and high density polyethylene (HDPE). The extrusion nozzle heats the filament to render the composite material flowable and regulates the flow of the composite material by controlling the filament feed rate. The extrusion nozzle can be moved in both horizontal and vertical directions by a computer-controlled mechanism. Alternatively, the printer platform bed may be moved relative to the extrusion nozzle, or coordinated movements of both the nozzle and platform may be used to achieve the desired extrusion path in the x, y, and z directions.

The 3D model is printed by extruding small beads or lines of the thermoplastic composite filament to form consecutive layers in the vertical direction (z direction). The material hardens immediately after extrusion from the extrusion nozzle. 3D printing capabilities are hindered by the weaker welds between printed filaments in the z direction, which often leads to delamination between filaments. Thus, there is a need for an apparatus, system, and/or process to make a 3D model using 3D printing that has improved welds between printed filaments in the z direction resulting in improved structural integrity of the printed 3D model.

SUMMARY

According to several aspects, a three-dimensional (3D) printing process is disclosed. The process includes the steps of: extruding a thermoplastic composite in successive layers to form a 3D part; directing an evenly distributed plasma onto a predetermined location on the 3D part; and emitting an electromagnetic energy through the plasma. The plasma conducts the electromagnetic energy to the predetermined location on the 3D part. The thermoplastic composite includes a conductive material that generates heat by reacting to the electromagnetic energy, which includes an electric current.

In an additional aspect of the present disclosure, the predetermined location on the 3D part is a location adjacent where a newly extruded layer of the thermoplastic composite is deposited onto a previously extruded layer of the thermoplastic composite.

In another aspect of the present disclosure, the electric current includes sufficient power to fuse the newly extruded layer of the thermoplastic composite with the previously extruded layer of the thermoplastic composite.

In another aspect of the present disclosure, the conductive material reacts includes at least one nanomaterial selected from a group consisting of carbon nanotube, carbon black, buckyballs, graphene, magnetic nanoparticles, and ferroelectric materials such as barium titanate.

In another aspect of the present disclosure, the conductive material includes a carbon nanotube selected from a group consisting of a single-wall carbon nanotubes (SWNT) and a multi-walled carbon nanotubes (MWNT).

In another aspect of the present disclosure, the thermoplastic composite includes at least one thermoplastic selected from a group consisting of acrylonitrile butadiene styrene (ABS), polycarbonate (PC), polylactic acid (PLA), polyamide (PA), polyetheretherketone (PEEK), and high density polyethylene (HDPE).

According to several aspects, an extrusion nozzle for a three-dimensional (3D) printer is disclosed. The extrusion nozzle includes a nozzle body defining a filament extrusion channel extending along an extrusion axis-A, the filament extrusion channel includes an extrusion end; and a plasma generating portion adjacent the extrusion end. The plasma generating portion is configured to generate and discharge an atmospheric plasma capable of conducting an electric current in a predetermined direction.

In an additional aspect of the present disclosure, the extrusion nozzle further includes a nozzle housing coaxially disposed about the extrusion nozzle body. The nozzle housing cooperates with the nozzle body to define a plasma generation channel configured for a gas flow there-through.

In another aspect of the present disclosure, the extrusion nozzle further includes a pair of electrodes disposed within the plasma generation channel. The pair of electrodes are configured to excite the gas flowing there-through to generate the atmospheric plasma.

In another aspect of the present disclosure, the plasma generation channel includes a plasma outlet adjacent the extrusion end of the filament extrusion channel. The plasma outlet is configured to direct the atmospheric plasma in a predetermined direction.

In another aspect of the present disclosure, the extrusion nozzle further includes means to induce a pressurized stream of gas through the plasma generation channel and exiting the plasma outlet.

In another aspect of the present disclosure, the extrusion nozzle further includes a first electrode disposed about an annulus on the nozzle body adjacent the extrusion end of the filament extrusion channel.

In another aspect of the present disclosure, the first electrode is configured to cooperate with a second electrode spaced from the first electrode to excite a gas therebetween to form the atmospheric plasma.

In another aspect of the present disclosure, the second electrode is spaced from the extrusion nozzle.

According to several aspects, three-dimensional (3D) printing system is disclosed. The 3D printing system includes a 3D printer configured to print a 3D part by extruding successive layers of a thermoplastic composite having a conductive material that generates heat by reacting to an electric current; a plasma emitter configured to generate and directed a plasma toward the 3D part being printed; and an electromagnetic energy source configured to generate and direct an electric current into the plasma such that the plasma conducts the electric current to the 3D part being printed.

In an additional aspect of the present disclosure, the 3D printing system further includes an extrusion nozzle configured to extrude the successive layers of the thermoplastic composite, wherein the plasma emitter and electromagnetic energy source are adjacent the extrusion nozzle.

In another aspect of the present disclosure, the plasma emitter includes a first electrode located on the extrusion nozzle and a second electrode spaced from the extrusion nozzle.

In another aspect of the present disclosure, the plasma emitter includes a first electrode located on the extrusion nozzle and a second electrode located on the extrusion nozzle.

In another aspect of the present disclosure, the 3D printing system further includes a first voltage source configured to power the plasma emitter; and a second voltage source configured to power the electromagnetic energy source. The first voltage source is independent of the second voltage source.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

Features and advantages of examples of the present disclosure will become apparent by reference to the following detailed description and drawings, in which like reference numerals correspond to similar components. The drawings are for illustration purposes only and are not intended to limit the scope of the present disclosure in any way.

DETAILED DESCRIPTION

The present disclosure relates to using atmospheric plasma as an electrical conduction pathway for the application of electromagnetic energy, such an alternating electric current or a direct electric current, for improving the interlayer adhesive strength of 3D printed parts produced with material extrusion 3D printing. The following description is merely exemplary in nature and is not intended to limit the present disclosure, application, or uses.

Figure 1:
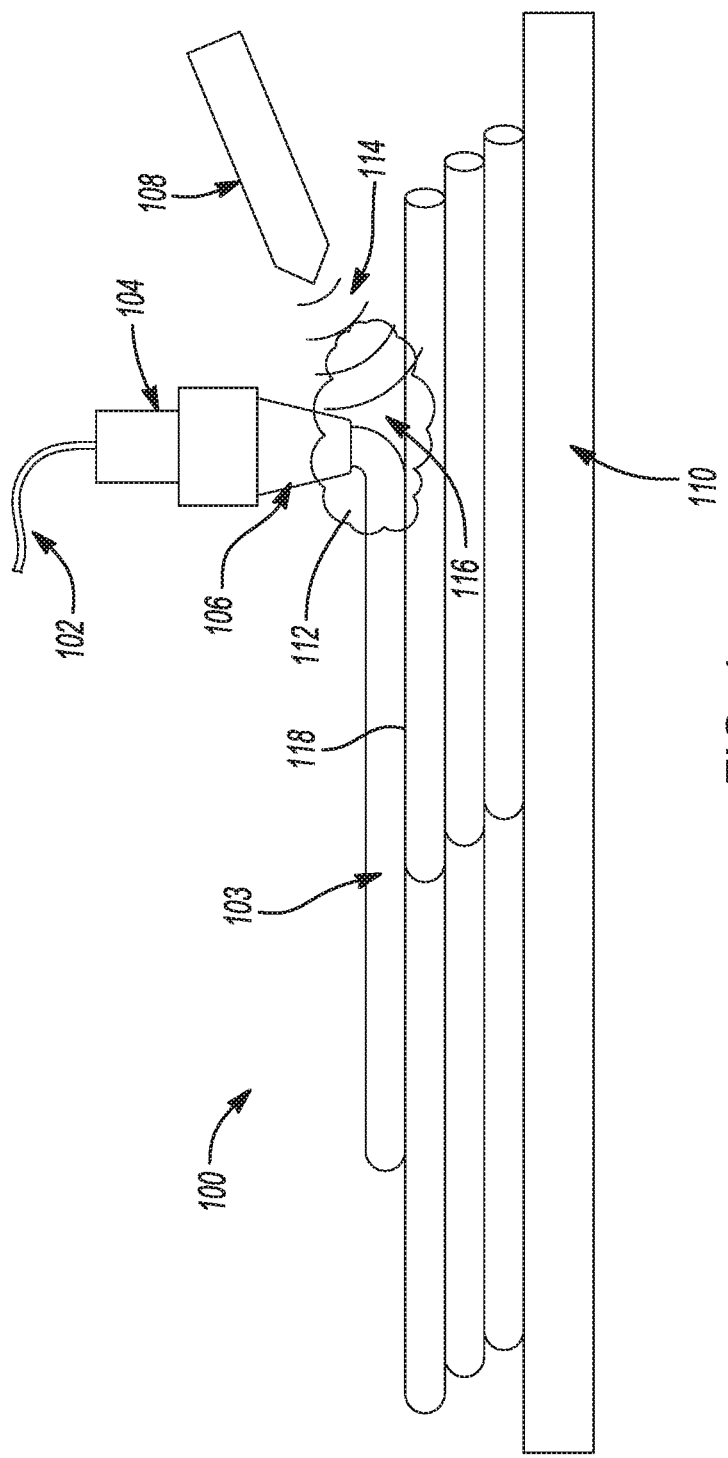
FIG. 1 is an illustration of an exemplary embodiment of a 3D printing process using atmospheric plasma as an electrical conduction pathway for the application of electromagnetic energy at the point of extrusion to control the welding of interlayers of extruded materials.

Shown in FIG. 1 is a 3D printing process 100 for printing 3D parts by extrusion deposition of a thermoplastic material 102 in droplets or continuous beads 103 in multiple layers. The 3D printing process 100 includes an extrusion nozzle 104 having a plasma generating portion 106, an electric current applicator source 108, and a platform bed 110. While the electric current applicator source 108 is shown separate from the extrusion nozzle 104, the electric current applicator 108 may be an integral part of the extrusion nozzle 104.

The 3D printing process 100 uses an atmospheric plasma 112 as an electrical conduction pathway for the application of electric current 114 at the point of extrusion 116 to control the welding of interlayers 118 of the extruded thermoplastic materials 102. It is desirable that the atmospheric plasma 112 is substantially evenly disturbed between the nozzle 104 and the 3D part being printed for the conduction of the electric current 114 between the nozzle 104 and the 3D part. A substantially evenly distributed atmospheric plasma 112 means a volume of plasma having uniform intensity and power to provide a conductive pathway to enable even heating of the 3D part or at least a portion of the 3D part proximal to the extrusion nozzle 104.

The extrusion nozzle 104 may be moved through a predetermined extrusion path in both horizontal and vertical directions by a computer-controlled mechanism (not shown) to print a 3D part having a predetermined shape and size. Alternatively, the platform bed 110 may be moved relative to the extrusion nozzle 104 or coordinated movements of both the nozzle 104 and platform 110 may be used to achieve the desired extrusion path in the x, y, and z directions.

The thermoplastic material 102 is fed through the extrusion nozzle 104 in a form of a thermoplastic composite filaments 102. The thermoplastic filament 102 may include various polymers such as, but not limited to, acrylonitrile butadiene styrene (ABS), polycarbonate (PC), polylactic acid (PLA), and high density polyethylene (HDPE). The thermoplastic filament 102 is surface coated and/or embedded throughout its volume with materials having conductive properties that reacts to the electric current or absorbs the electric current to generate heat. It is desirable that sufficient heat is generated to weld the interlayers 118 of extruded thermoplastic materials 102, thus increasing the interlayer 118 bond strength throughout the body of the 3D printed part. In the exemplary embodiment shown, the thermoplastic composite filaments 102 are surface coated with carbon nanotubes (CNTs). The CNTs may include single-wall carbon nanotubes (SWNT), multi-walled carbon nanotubes (MWNT), and/or functionalized carbon nanotubes. Other forms of electric current absorbing nanomaterials, such as carbon black, buckyballs, graphene, and/or magnetic nanoparticles, can also be used.

Figure 2:
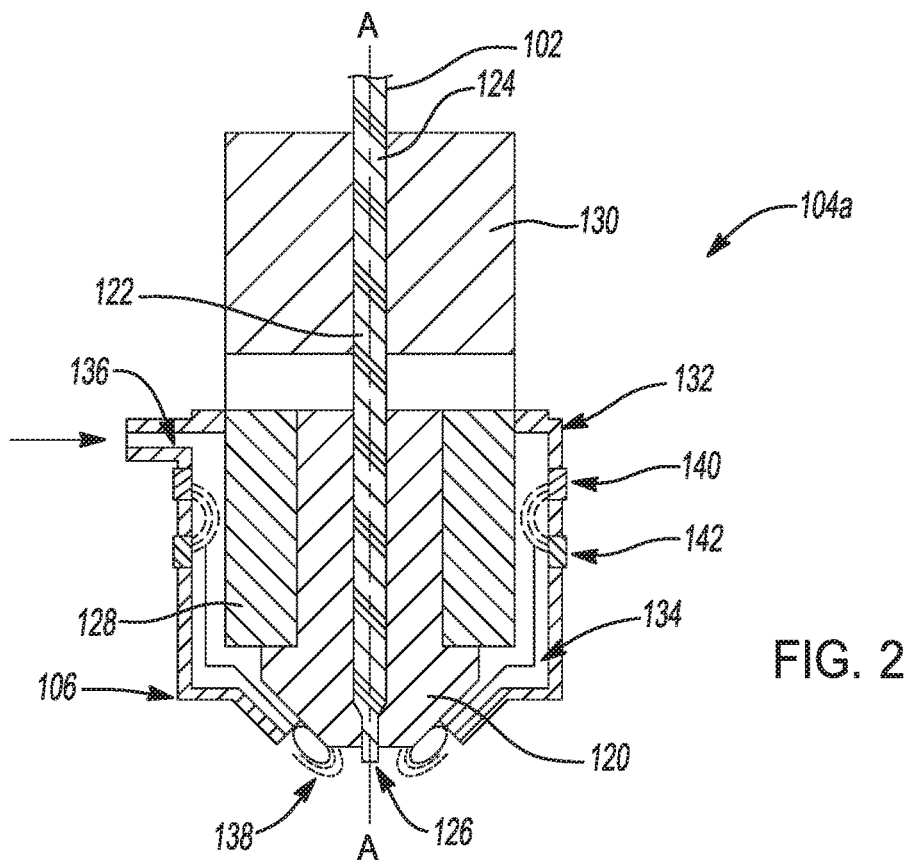
FIG. 2 is an illustration of a semi-schematic cross-section of an embodiment of a 3D printer nozzle for generating a plasma.

Referring to both FIG. 1 and FIG. 2, the extrusion nozzle 104a is configured to heat the thermoplastic filament 102 to a molten state and extrude the molten thermoplastic material 102 in successive layers onto the platform bed 110 until the 3D part has been printed. The extrusion nozzle 104a includes a plasma generating portion 106 configured to generate an atmospheric plasma 112 for conducting electric current to weld the interlayers 118 of extruded composite material 102. Shown in FIG. 2, the extrusion nozzle 104a includes a nozzle body 120 defining a filament extrusion channel 122 extending along an extrusion axis-A. The filament extrusion channel 122 includes a filament feed end 124 and an opposite filament extrusion end 126. The extrusion nozzle 104a further includes a heater element 128 in thermal contact with the extrusion channel 122. The heater element 128 melts the thermoplastic filament 102 to a molten state as the thermoplastic filament 102 is fed through the filament extrusion channel 122 from the feed end 124 to the extrusion end 126. Heat breaks 130 are provided adjacent the filament feed end 124 to insulate the extrusion nozzle 104a from the remainder of the 3D printer (not shown).

Figure 3:
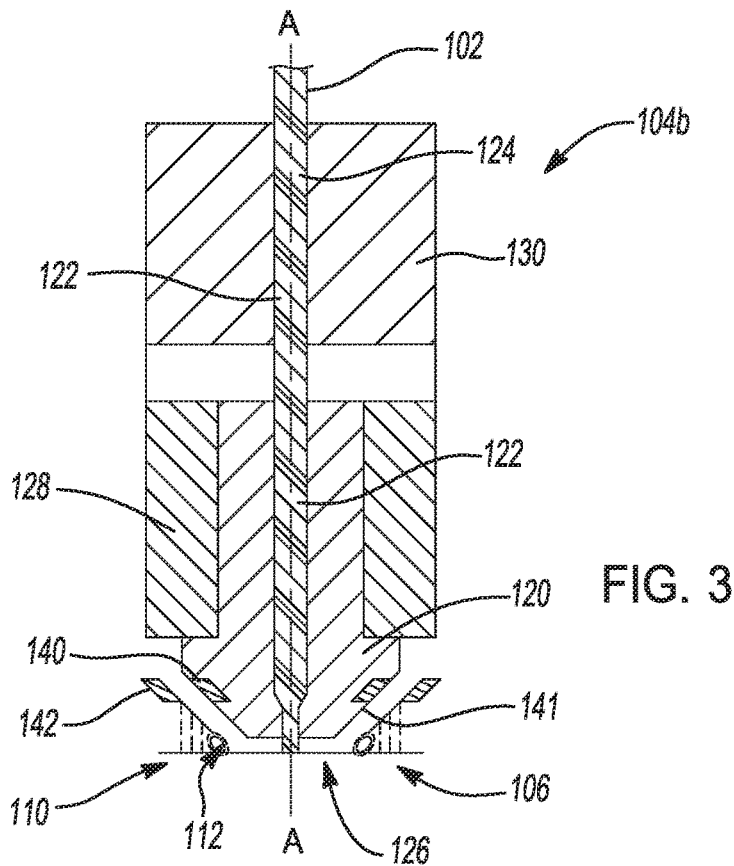
FIG. 3 is an illustration of a semi-schematic cross-section of another embodiment of a 3D printer nozzle for generating a plasma.

Coaxially disposed about the extrusion nozzle body 120 is a nozzle housing 132. The nozzle housing 132 cooperates with the nozzle body 120 to define a plasma generation channel 134 therebetween. The plasma generation channel 134 includes a gas inlet 136 and a plasma outlet 138 opposite the gas inlet 136 adjacent the extrusion end 126 of the filament extrusion channel 122. A pair of electrodes 140, 142 is disposed within the plasma generation channel 134. A pressurized stream of gas including, but not limited to, argon, helium, carbon dioxide, and air is induced through the plasma generation channel 134 from the inlet 136 to the outlet 138. The pressurized stream of gas may be generated via fans, blowers, pumps, or pressurized gas tanks. As the gas flows through the plasma generation channel, the pair of electrodes 140, 142 are configured to excite the gas to generate a plasma stream 112. The plasma stream 112 exits the plasma outlet 138 and is directed at the 3D part being printed Shown in FIG. 3 is another embodiment of an extrusion nozzle 104b having a plasma generating portion 106. Similar to the extrusion nozzle 104a, the extrusion nozzle 104b includes a nozzle body 120 defining a filament extrusion channel 122, a filament feed end 124, a filament extrusion end 126, a heater element 128, and heat breaks 130. The extrusion nozzle 104a further includes a first electrode 140 disposed about an annulus 141 on the nozzle body 120 adjacent the extrusion end 126 of the filament extrusion channel 122. The first electrode 140 is configured to cooperate with a second electrode 142 spaced apart from the first electrode 140 to excite a gas therebetween to form a plasma 112. The second electrode 142 may be provided on the platform bed 110, conductive materials on the newly printed 3D part, or the coating on the surface of the thermoplastic filaments 102 or embedded within the volume of the recently printed layer of thermoplastic material 102 itself.

Referring back to FIG. 1, the electric current applicator source 108 is configured to emit an electric current 114 toward the plasma 112 produced by the extrusion nozzle 104. The electric current 114 includes a predetermined frequency and power sufficient to react with the CNTs in the extruded thermoplastic materials 102 to generate sufficient heat to weld or fuse the interlayers of extruded thermoplastic material 102 into a solid integral structure. The electric current 114 can be focused upon the newly, or immediately, printed location 116 using the electric current applicator source 108 located immediate adjacent the nozzle 104. The application of electric current 114 adjacent the nozzle 104 generates localized heating 116 as the part is being printed. The electric current applicator source 108 can be attached to the printer head directly in order to move with the extrusion nozzle 104. This localized electric current heating allows for the electric current 114 to be applied during printing, with only the immediately-printed area being exposed rather than the entire volume of the 3D part. The nozzles 104a, 104b and electric current applicator source 108 may be used in conjunction with a thermoplastic material extrusion 3D printer either as a built-in feature or as an add-on kit to be connected to an existing 3D printer.

Figure 4:
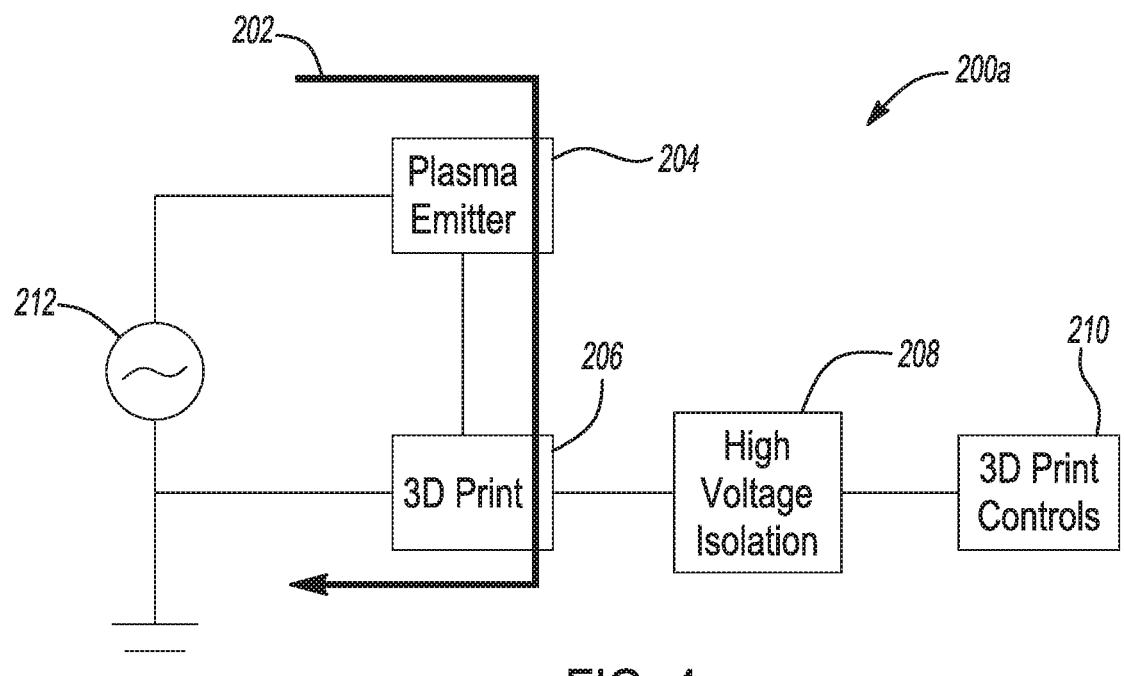
FIG. 4 is a schematic of an embodiment of a 3D printing system using plasma as an electrical conduction pathway for the application of electromagnetic energy to fuse 3D printed parts.

FIG. 4 is a schematic of an embodiment of a 3D printing system 200a using plasma as an electrical conduction pathway for the application of electromagnetic energy, such as an electric current, to fuse interlayers of 3D printed parts. The 3D printing system 200a includes an electromagnetic energy source 202 for generating an electric current, a plasma emitter 204, a 3D printer 206, a high voltage isolator 208, 3D printer controls 210, and a high voltage supply 212, which could may include a direct current (DC) source, pulsed DC source, or alternating current (AC) source. The electromagnetic energy source 202 is powered by the high voltage supply 212.

The 3D printer 206 includes a 3D printer nozzle head, such as the extrusion nozzles 104a, 104b shown in FIGS. 2 and 3, configured to allow a high voltage potential to be applied directly to the nozzle body, to an electrode near the print head, or to a collar surrounding the nozzles. This high voltage potential will excite either a distributed plasma cloud or a focused plasma stream directed at the 3D printed parts. The plasma emitter 204 requires a high voltage source 212, a control unit to manage the voltage and current during the print, and certain circuit isolation 208 shielding requirements necessary to isolate the high voltage potential from damaging or interfering with the electronic 3D printer controls 210.

It is desirable to combine optimal plasma distribution and electromagnetic heating to produce optimal 3D print strength improvement. The electromagnetic energy applied through the plasma could come from the plasma generating high voltage electronics. The electromagnetic energy is applied directly to the 3D printer nozzles 104a, 104b or concentrically around the nozzle body 120. A benefit is the ability to provide a local conduction pathway for the coupling of the electric current applicator 108 to the 3D part being printed. The plasma is produced near the 3D printer nozzle 104a, 104b and directed at a local region where the electric current energy is required to be dissipated. The plasma interacts with the conductive thermoplastic in such a way as to provide an ionized electron pathway either to or from the electric current applicator source 108 located at or near the nozzle 104.

Figure 5:
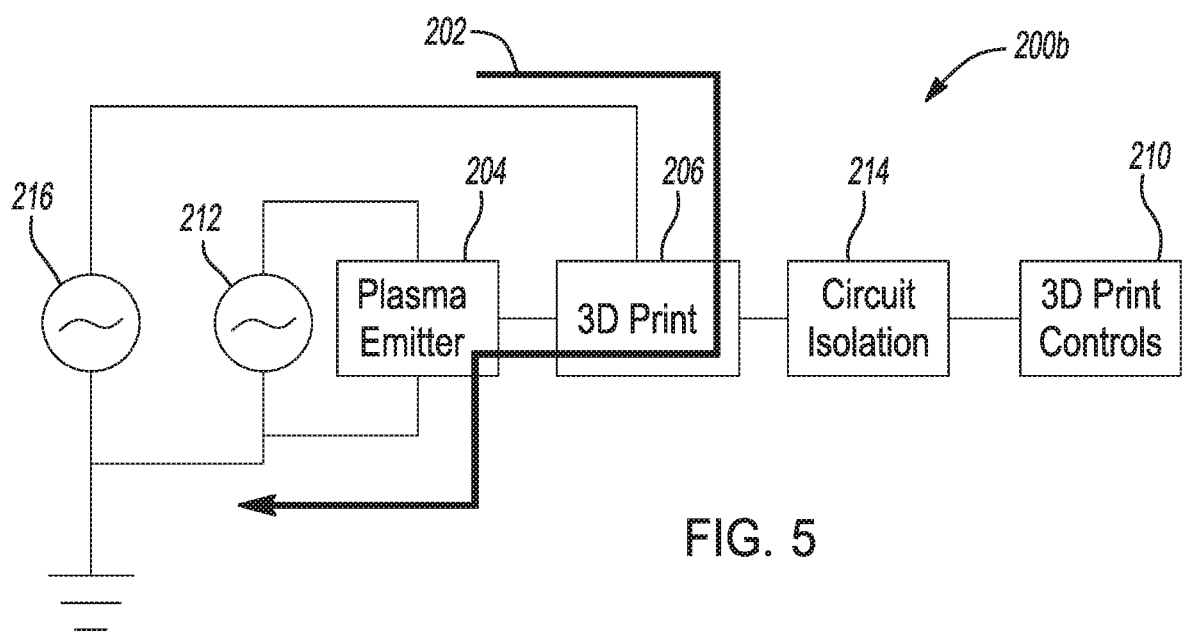
FIG. 5 is a schematic of another embodiment of a 3D printing system using plasma as an electrical conduction pathway for the application of electromagnetic energy to fuse 3D printed parts.

Alternatively, the electromagnetic energy source 202 could be powered from an external source 216 as shown in FIG. 5. The 3D printing system 200b includes an electromagnetic energy source 202, a plasma emitter 204, 3D printer controls 210, circuit isolation 214, a high voltage supply 212 (first voltage source), and an external voltage supply 216 (second voltage source). The plasma emitter 204 and electromagnetic energy source 202 are operated independently and separately from the 3D printer nozzle 104a, 104b. The important factor being that the plasma emitter 204 and electromagnetic energy source 202 are co-located or adjacently located to enable a conduction pathway for the electric current energy. In the 3D printing system 200b where the plasma emitter 204 operates independently from the electromagnetic energy source 202, the electrical energy flowing through the plasma is also flowing through the conductive 3D printed part to improve the interlayer adhesive strength. Since an external source 216 is used, it may require a signal generator, signal filter, power amplifier, power supply, isolation circuits 214 for printer protection, and additional print nozzle attachments for quick release connections of the electromagnetic energy source 202. For this exemplary embodiment, the electromagnetic energy is supplied by the external voltage supply 216.

An early prototype of the plasma conduction pathway for 3D printing was developed using a 15-kHz high voltage generator and a flyback transformer to produce voltages near 80,000 volts with an associated current less than 0.5 milli-Amps. The high voltage ground connection was attached to the hot end of a 3D printer, and the high voltage hot connection was attached to an electron emitter. An annular ring type electron emitter was cut from aluminum sheet to produce an evenly distributed plasma around the 3D printer nozzle 104. The high voltage plasma generator successfully produced both plasma and an electromagnetic signal, which heated conductive plastics through the plasma during multiple 3D prints. Additional experiments have shown that evenly distributed plasma jets can be produced with the same hardware to potentially reduce the localized heating effects from an arc discharge type plasma. It is desirable that the distributed plasma includes uniform intensity and power in order to provide a conductive pathway between the 3D printer nozzle 104 and the 3D printed part to enable even heating of the 3D part.

By using an atmospheric plasma as a conduction pathway for electromagnetic energy that heats the conductive 3D printed parts, the electromagnetic energy source can use a constant power level to heat 3D printed parts evenly even as the parts grow larger. With the current 3D printed parts, the geometry dependent resistance is eliminated because the resistive pathway being heated is a constant volume and shape as determined by the shape of the plasma produced and the penetration depth of the electromagnetic energy into the 3D printed part. As the part is being printed, a local ground path is generated near the nozzle 104 through the conductive atmospheric plasma 112, which allows a constant power dissipation and heating rate to be maintained.

The following references are incorporated herein by reference in their entireties:
[1] C. B. Sweeney, B. Teipel, T. Eubanks, J. Stockton, and A. Stockton. "Non-radiating near-field and direct contact application of electrical energy for in-situ and targeted heating of thermoplastic 3D printed parts." Essentium Materials, patent in process since Oct. 11, 2016.
[2] T.-C. Tsai, et al. "3d printers having plasma applicators and methods of using same." US 20160271874 A1, Sep. 22, 2016.
[3] T.-C. Tsai, et al. "3d printers having plasma applicators and method of using same." WO 2016154103 A1, Sep. 29, 2016.
[4] K. Ramaswamy, T. Detrick, S. Nemani, and A. Joshi. "Three-dimensional (3d) processing and printing with plasma sources." US 20150042017 A1, Feb. 12, 2015.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A three-dimensional (3D) printing process for a three-dimensional (3D) printer, the process comprising the steps of:
extruding through a filament channel defined in a nozzle body a thermoplastic composite in successive layers to form a 3D part, wherein the nozzle body has an extrusion end and a heat break opposing the extrusion end and wherein the thermoplastic composite comprises a conductive material reactive to an electric current for heat generation;
exciting a gas to generate an atmospheric plasma in an annular plasma generation channel defined by a nozzle housing and the nozzle body with a first electrode comprising a first annular ring disposed in the annular plasma generation channel, wherein the nozzle housing is coaxially disposed about the nozzle body between the extrusion end and the heat break of the nozzle body;
directing the plasma onto a predetermined location on the 3D part; and
emitting, using the annular ring, the electric current into the plasma,
wherein the plasma conducts the electric current to the predetermined location on the 3D part, and
wherein the conductive material reacts with the electric current conducted by the plasma to generate sufficient heat to fuse at least two adjacent successive layers at the predetermined location on the 3D part.

2. The process of claim 1, further comprises an electromagnetic energy source configured to emit the electric current;
wherein the plasma is substantially evenly distributed between the electromagnetic energy source and the 3D part.

3. The process of claim 2, wherein the predetermined location on the 3D part is a location adjacent to where a newly extruded layer of the thermoplastic composite is deposited onto a previously extruded layer of the thermoplastic composite.

4. The process of claim 3, wherein the electric current includes sufficient power such that the conductive material generates sufficient heat to fuse the newly extruded layer of the thermoplastic composite with the previously extruded layer of the thermoplastic composite.

5. The process of claim 1, wherein the conductive material comprises at least one nanomaterial selected from a group consisting of carbon nanotube, carbon black, buckyballs, graphene, and magnetic nanoparticles, and ferroelectric materials such as barium titanate.

6. The process of claim 1, where the conductive material comprises a carbon nanotube selected from a group consisting of a single-wall carbon nanotubes (SWNT) and a multi-walled carbon nanotubes (MWNT).

7. The process of claim 1, wherein the thermoplastic composite comprises at least one thermoplastic selected from a group consisting of acrylonitrile butadiene styrene (ABS), polycarbonate (PC), polylactic acid (PLA), polyamide (PA), polyetheretherketone (PEEK), and high density polyethylene (HDPE).

8. An extrusion nozzle for a three-dimensional (3D) printer having a ground reference, the extrusion nozzle comprising:
a nozzle body defining a filament extrusion channel having an extrusion end and a heat break opposing the extrusion end;
a nozzle housing coaxially disposed about the nozzle body between the extrusion end and the heat break of the nozzle body, wherein the nozzle housing and the nozzle body define an annular plasma generation channel; and
a first electrode comprising a first annular ring that is positioned within the annular plasma generation channel about the nozzle body, wherein the first electrode in the annular plasma generation channel is configured to generate an atmospheric plasma.

9. The extrusion nozzle of claim 8, further comprising a second electrode comprising a second annular ring, with the second electrode disposed within the annular plasma generation channel.

10. The extrusion nozzle of claim 8, wherein the annular plasma generation channel comprises a plasma outlet adjacent to the extrusion end of the filament extrusion channel, wherein the plasma outlet is configured to direct the atmospheric plasma in a predetermined direction.

11. The extrusion nozzle of claim 10, further comprising means to induce a gas flow there-through the plasma generation channel.

12. The extrusion nozzle for a three-dimensional (3D) printer of claim 8, further comprising a second electrode comprising a second annular ring, with the first and second electrodes spaced from one another along an axis of the filament extrusion channel and cooperate with one another to excite a gas therebetween to form the atmospheric plasma.

13. The extrusion nozzle for a three-dimensional (3D) printer of claim 8, further comprising a heating element disposed between the extrusion end and the heat break of the nozzle body.

14. The extrusion nozzle of claim 13, wherein the heating element is present in the annular plasma generation channel.

15. The extrusion nozzle for a three-dimensional (3D) printer of claim 8, further comprising one or more of fans, blowers, pumps and pressurized gas tanks to induce a gas flow there-through the plasma generation channel.

16. A three-dimensional (3D) printing system comprising:
a 3D printer configured to print a 3D part by extruding through a nozzle body defining a filament extrusion channel having an extrusion end and a heat break opposing the extrusion end successive layers of a thermoplastic composite comprising a conductive material that generates heat by reacting to an electric current;
a plasma emitter configured to generate and direct a plasma toward the 3D part being printed through an annular plasma generation channel defined by the nozzle body and a nozzle housing coaxially disposed about the nozzle body between the extrusion end and the heat break opposing the extrusion end; and
an electromagnetic energy source that is a first electrode comprising an annular ring that is disposed within the annular plasma generation channel configured to generate and direct the electric current into the plasma such that the plasma conducts the electric current to the 3D part being printed.

17. The 3D printing system of claim 16, wherein the plasma emitter includes a second electrode comprising a second annular ring, wherein the second electrode is disposed within the annular plasma generation channel.

18. The 3D print system of claim 17, further comprising:
a first voltage source configured to power the plasma emitter; and
a second voltage source configured to power the electromagnetic energy source;
wherein the first voltage source is independent of the second voltage source.

* * * * *